UNITED STATES PATENT OFFICE.

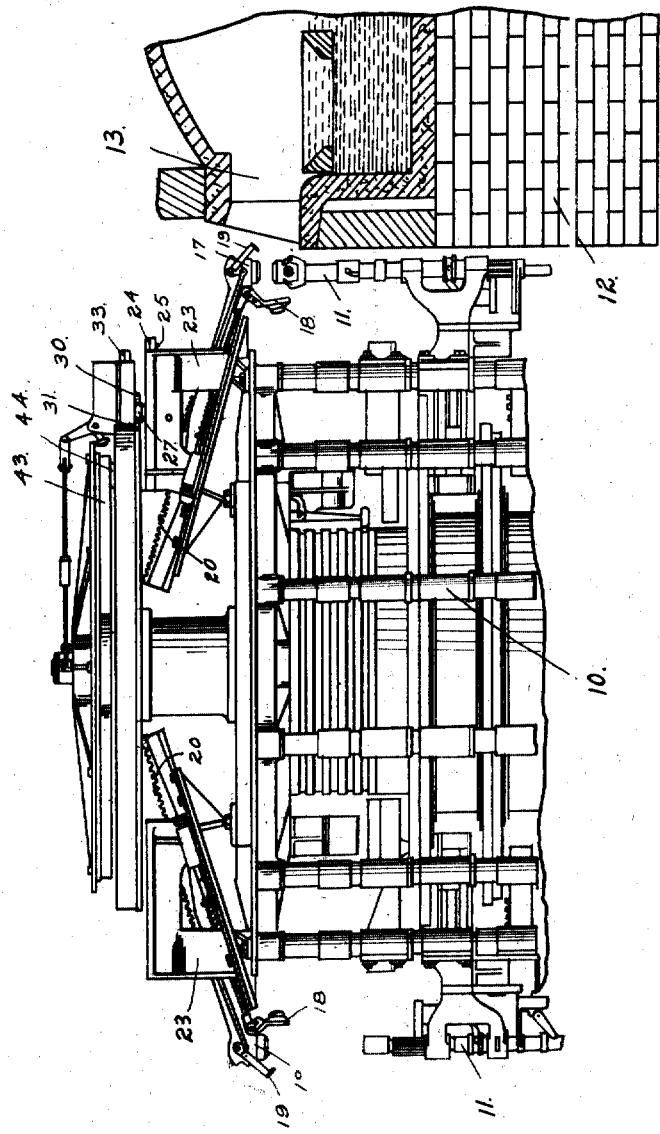

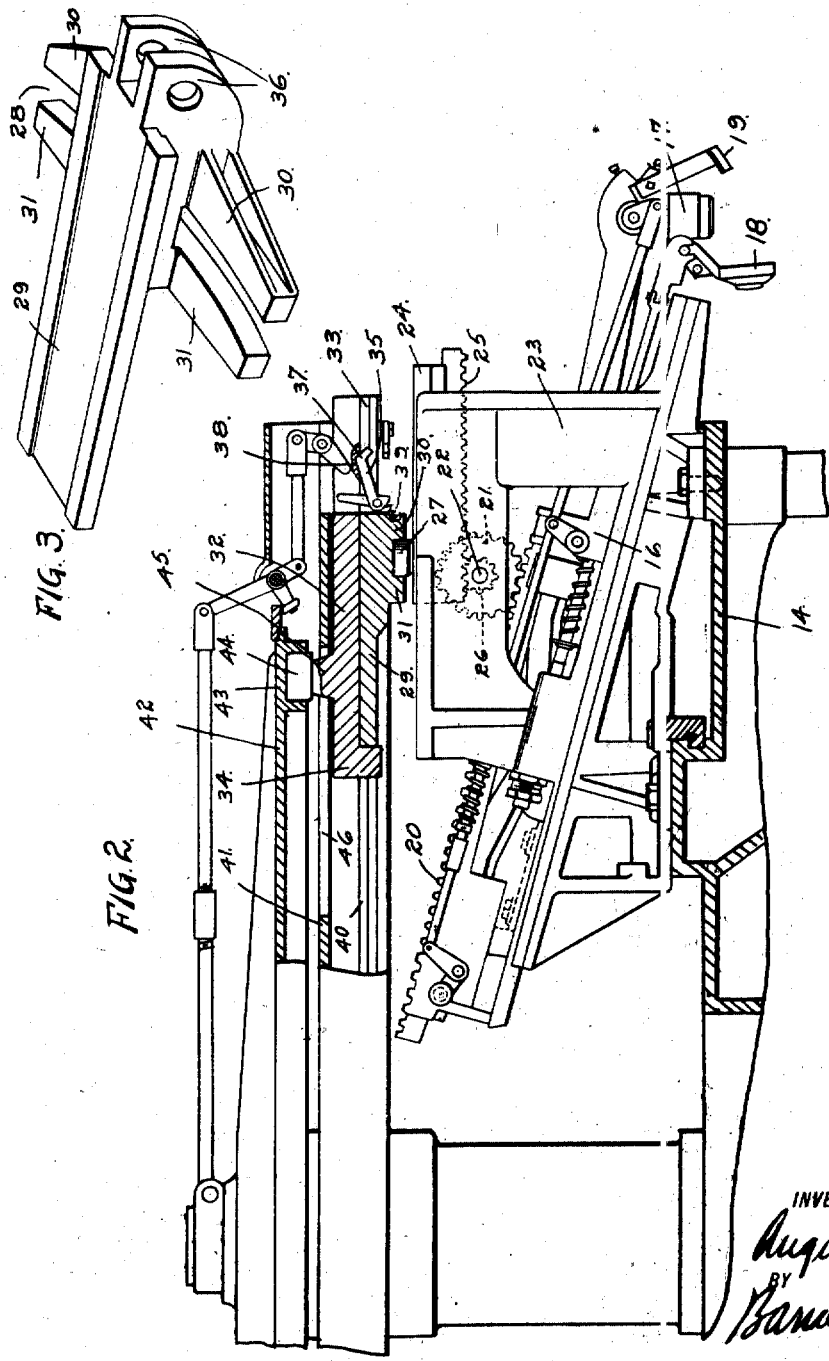

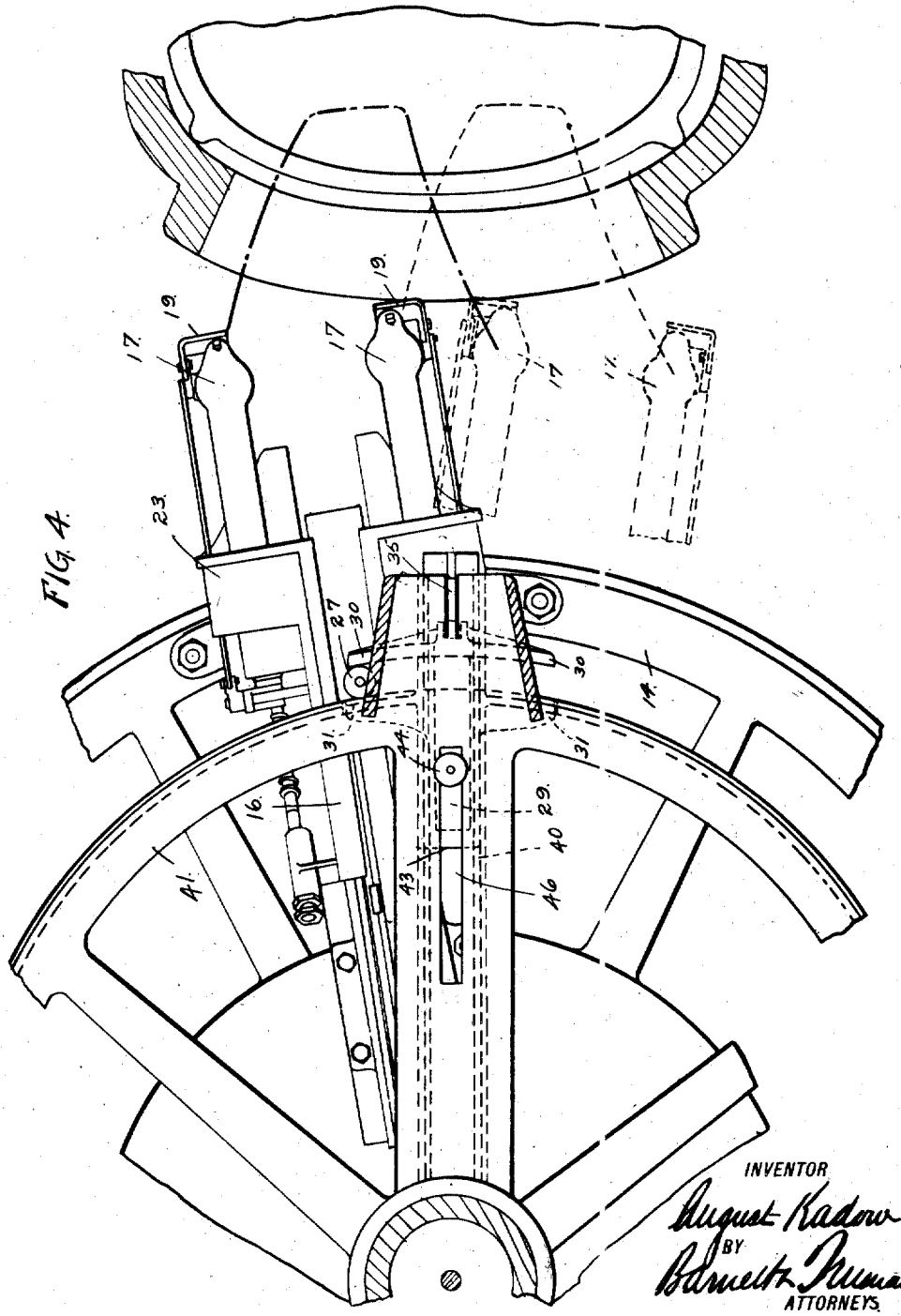

AUGUST KADOW, OF TOLEDO, OHIO, ASSIGNOR TO THE WESTLAKE MACHINE COMPANY, OF TOLEDO, OHIO, A CORPORATION OF OHIO.

GLASS-GATHERING MECHANISM.

1,223,393.    Specification of Letters Patent.    Patented Apr. 24, 1917.

Application filed January 11, 1917. Serial No. 141,886.

*To all whom it may concern:*

Be it known that I, AUGUST KADOW, a citizen of the United States, residing at Toledo, in the county of Lucas and State of Ohio, have invented certain new and useful Improvements in Glass-Gathering Mechanism, of which the following is a specification.

My invention relates to machinery for manufacturing glass articles, and more particularly to a mechanism for gathering the glass and forming the same into blanks suitable for blowing or other treatment necessary for the production of the finished article.

The invention may be regarded as an improvement upon or modification of the machine shown in my co-pending application Serial No. 570,621 filed July 6, 1910, and in my British Patent No. 26,222 of 1911, although the construction and arrangements constituting the present invention are susceptible of employment in apparatus somewhat different in its design and organization from that shown in said application.

The type of glass forming machine with which this invention is concerned, comprises a rotating structure provided with one or more glass gathering units which are periodically brought to a point opposite the working opening of a stationary glass furnace and are thrust into said opening to make the successive gathers. When the blanks have been formed in this way they are delivered to spindles, or other mechanisms, for further treatment, said devices being preferably carried on the same rotating structure which supports the gathering mechanisms so that the manufacture of the articles is completed by a series of automatic operations which are carried out by different parts of a single machine.

In the glass forming machine shown in said application Serial No. 570,621, the rotary movement of the ram or gathering device is arrested during the periods when the ram is thrust into and withdrawn from the furnace, without interrupting the continuous rotary movement of the supporting structure. After the gather has been made the ram is given a swinging or circular movement more rapid than that of the supporting structure in order to bring the ram back to its normal position with respect thereto. These movements require mechanism of some complexity.

The principal object of my present invention is to obtain a simplification of the gathering apparatus in a machine of this general type, by providing a gathering mechanism and ram for operating the same, so constructed that the gather is made without interrupting the continuous rotary movement of the ram and also without arresting the movement of rotation of the supporting structure.

The invention is illustrated in a preferred embodiment in the accompanying drawings wherein—

Figure 1 shows, in elevation, the upper portion of a glass-forming machine of the type with which my present invention is concerned, together with a portion of the glass furnace from which the gather is made, the latter being in section.

Fig. 2 is a radial sectional view, with parts in elevation, illustrating the construction of the gathering ram and its actuating mechanisms.

Fig. 3 is a view, in perspective, of one of the slides forming part of said actuating mechanism, and Fig. 4 is a plan view of the ram and associated parts, certain structures, not relevant to the present invention, being omitted for the purpose of clearness of illustration.

Like characters of reference designate like parts in the several figures of the drawings.

Inasmuch as many of the details of construction of the machine considered as a whole, which are necessarily shown in the drawings, have no bearing upon my present invention, the description will be limited to such portions of the machine as require description for an understanding of the improvement here concerned.

Referring to the drawings, 10 designates a rotary structure adapted to support a number of glass gathering units, to be hereinafter described. This structure is shown as carrying also a plurality of spindles 11 which are arranged to receive the glass blanks after they have been gathered and formed. 12 is a glass furnace which is stationary and is provided with a working opening 13. Fixed to a plate 14 forming part of the rotary structure 10, is an inclined support 15 for the glass gathering ram 16 which is adapted to reciprocate radially of the machine. The ram is shown as provided with two gathering molds 17 so that two gathers may be made simultaneously. Mechanism is provided for opening and closing the lower or swinging mold sections 18 and for operating the cut-off knives 19 to remove the surplus glass from the molds after the gathers have been made. My present invention is not concerned with these mechanisms.

The ram is provided with a rack 20 which is in mesh with a pinion 21 keyed to a shaft 22 which is mounted in a housing 23 forming part of the ram support 15, the ram being arranged so as to slide back and forth through this housing. In the upper part of the housing is mounted, for reciprocal movement, a slide 24 formed with a rack 25 adapted to mesh with a pinion 26 on shaft 22 of considerably smaller diameter than pinion 21. On the top of slide 24 is pivoted an anti-friction roller 27 which is adapted to enter and pass through, from end to end, a slot 28 in a slide 29, the slot being formed in part by providing slide 29 with pairs of projections 30, 31, as shown in Fig. 3. The slide 29 is engaged with a slide 32, the latter being provided with guideways 33 for the former, and the two elements being normally held against relative longitudinal movement by a shoulder 34 on the upper slide 32 and by a locking dog 35 pivoted between ears 36 on the lower slide 29 and held with its nose 37 in a notch 38 in the upper slide by means of a coiled spring 39. The machine provides mechanism for disengaging the upper and lower slides, as shown in my said co-pending application 570,621, but such mechanism has no concern with the present invention. The two slides 29, 32 are provided so that, if desired, by disengaging the dog 37 by means of manually operated connections, as explained in my said co-pending application, the ram may be disconnected from its actuating mechanism. For the purpose of this invention the elements 29, 32 may be considered as forming a single slide. This slide is moved in guideways 40 formed in a stationary structure 41 by means of a rotating cam 42, the channeled camway 43 of which engages an anti-friction roller 44 mounted on a stud 45 which projects through a slot 46 in the stationary structure 41.

*Operation:* It will be understood that the slide 29, 32 is arranged on a stationary structure at a point opposite the working opening of the furnace. The ram rotates uninterruptedly with the rotary structure 10. When the ram, in its movement of rotation, reaches a point opposite the working opening of the furnace, the roller 27 in slide 24 enters slot 28 of slide 29, 32. At the same time the cam channel 46 of rotating cam 42 takes inward bend, as a result of which slide 29, 32 is drawn inwardly toward the axis of the machine and with it slide 24. The movement of the latter slide rotates pinions 26, 21 and the latter being meshed with rack 20 on the ram, causes the ram to be thrust forward into the working opening of the furnace. The cam channel 43 of the rotating cam has an outward bend so placed as to effect the withdrawal of the ram from the glass furnace as soon as the gather has been made. The broken lines in Fig. 4 indicate the travel of the gathering molds on the end of the ram.

By means of the mechanism above described the ram is projected into and withdrawn from the furnace without any cessation in its movement of rotation. Consequently the gathering mechanism is considerably simpler than the mechanism disclosed in my co-pending application above referred to. The ram, in continuing its rotation, as it approaches the position opposite the pot, is reciprocated radially into and from the pot, the roller 27 passing through the slot 28 while the slide 29—32 is being reciprocated by the dip cam 42. The cam 42 rotates at a speed to repeat this operation whenever one of the rams comes opposite the pot.

I claim:

1. In apparatus for manufacturing glass articles, the combination with a glass furnace having a working opening, of a continuously rotating structure and a gathering mechanism having a fixed radial relation with said rotating structure so that it rotates therewith uninterruptedly; said mechanism comprising a gathering ram movable in the direction of its length radially of said machine, and means for producing reciprocating movements of said gathering ram timed to thrust the same into and withdraw it from the working opening of said furnace.

2. In apparatus for manufacturing glass articles, the combination with a glass furnace having a working opening of a rotary structure, and a gathering mechanism having a fixed relation with said rotary structure so that it rotates therewith uninterruptedly; said mechanism comprising a gathering ram movable in the direction of its length, a rotating cam and non-rotating means actuated by the cam to reciprocate the ram and having an engagement with the ram which allows the continuous rotation thereof during reciprocation.

3. In apparatus for manufacturing glass articles, the combination with a glass furnace having a working opening, of a rotary structure, a glass gathering ram, a support having a fixed radial position on the rotary structure on which support the ram has movement only in the direction of its length, a slide on said rotary structure for imparting reciprocating movements to the ram, a stationary structure, a slide mounted thereon with capacity for longitudinal movement, means providing a connection between said slides whereby the slide on the stationary support imparts its movement to the other slide while permitting rotation of the latter, and means for imparting intermittent movements of reciprocation to the slide on the stationary support.

4. In apparatus for manufacturing glass articles, the combination with a glass furnace having a working opening of a rotary structure, a glass gathering ram, a support having a fixed radial position on the rotary structure on which the ram has movement only in the direction of its length, a slide on said rotary structure for imparting reciprocating movements to the ram, a stationary structure, a slide mounted thereon with capacity for longitudinal movement, means providing a connection between said slides whereby the slide on the stationary support imparts its movement to the other slide while permitting rotation of the latter, and a rotary cam for imparting movements of reciprocation to the slide on the stationary support.

5. In apparatus for manufacturing glass articles, the combination with a glass furnace having a working opening of a rotary structure, a glass gathering ram, a support fixed to the rotary structure on which the ram has movement only in the direction of its length, a slide on said rotary structure for imparting reciprocating movements to the ram, a stationary structure, a slide mounted thereon with capacity for longitudinal movement, one of said slides being formed with a slot and the other with an element projecting into said slot for communicating movement from one slide to the other and movable in said slot to permit the movement of rotation of the slide on the rotary structure while the slides are in engagement with each other, and means for imparting reciprocating movements to the other slide.

6. In apparatus for manufacturing glass articles, the combination with a glass furnace having a working opening, of a rotary structure, a glass gathering ram, a support fixed to the rotary structure on which the ram has movement only in the direction of its length, a slide on said rotary structure for imparting reciprocating movements to the ram, a stationary structure, a slide mounted thereon with capacity for longitudinal movement, one of said slides being formed with a slot and the other with a roller projecting into said slot for communicating movement from one slide to the other and movable in said slot to permit the movement of rotation of the slide on the rotary structure while the slides are in engagement with each other, and means for imparting reciprocating movements to the other slide.

7. In apparatus for manufacturing glass articles, the combination with a glass furnace having a working opening of a stationary structure, a slide on said stationary structure movable in the direction to and from said opening, a rotary structure, a slide movable on a radial line of said rotary structure, means for imparting reciprocating movements to said first-named slide, means providing a connection between said slides whereby the first-named slide imparts its movement to the other without preventing the movement of rotation of the latter while the slides are in engagement with each other, and a reciprocating gathering ram on the rotary structure movable only in the direction of its length, to which movements of reciprocation are imparted by the slide on the rotary structure.

8. In apparatus for manufacturing glass articles, the combination with a glass furnace having a working opening of a stationary structure, a slide on said stationary structure movable in the direction to and from said opening, a rotary structure, a slide movable on a radial line of said rotary structure, means for imparting reciprocating movements to said first named slide, one of said sides being formed with an arcuate slot and the other provided with a member adapted to project into said slot to permit movement of rotation of the slide on the rotary structure while the slides are in engagement with each other, and a gathering ram on said rotary structure to which reciprocating movements are imparted by the slide on said rotary structure.

9. In apparatus for manufacturing glass articles, the combination with a glass furnace having a working opening of a stationary structure, a slide on said stationary structure movable in the direction to and from said opening, a rotary structure, a slide movable on a radial line of said rotary structure, means for imparting reciprocating movements to said first-named slide, one of said slides being formed with an arcuate slot and the other provided with a roller adapted to project into said slot to permit movement of rotation of the slide on the rotary structure while the slides are in engagement with each other, and a gathering ram on said rotary structure to which reciprocating movements are imparted by the slide on said rotary structure.

10. In apparatus for manufacturing glass articles, the combination with a glass furnace having a working opening, of a stationary structure, a slide on said stationary structure movable in a direction to and from said opening, a rotary structure, a slide movable on a radial line of said rotary structure, means for imparting reciprocating movements to said first-named slide, said first-named slide being formed with an arcuate slot and the other slide being provided with a roller adapted to enter said slot to permit movement of rotation of the slide on the rotary structure while the slides are in engagement with each other, and a gathering ram on said rotary structure to which reciprocating movements are imparted by the slot on said rotary structure.

AUGUST KADOW.